(12) United States Patent
Cho et al.

(10) Patent No.: US 7,787,817 B2
(45) Date of Patent: Aug. 31, 2010

(54) METHOD FOR PROVIDING HETEROGENEOUS SERVICES IN TERRESTRIAL DIGITAL MULTIMEDIA BROADCASTING SYSTEM USING PICTURE-IN-PICTURE FUNCTION

(75) Inventors: Jeong-Sik Cho, Suwon-si (KR); Young-Jip Kim, Suwon-si (KR); Byoung-Dai Lee, Seongnam-si (KR); Jun-Young Choe, Seoul (KR); Ji-Wuck Jung, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 958 days.

(21) Appl. No.: 11/543,434

(22) Filed: Oct. 5, 2006

(65) Prior Publication Data

US 2007/0118858 A1    May 24, 2007

(30) Foreign Application Priority Data

Oct. 12, 2005    (KR) ...................... 10-2005-0096089

(51) Int. Cl.
*H04H 20/71* (2008.01)
(52) U.S. Cl. ...................... 455/3.01; 455/3.05; 455/132; 455/149; 455/272; 455/500; 455/528; 455/59; 455/72; 725/63; 348/14.07
(58) Field of Classification Search ................... 45/3.01; 455/3.01
See application file for complete search history.

(56) References Cited

U.S. PATENT DOCUMENTS

| | | | | |
|---|---|---|---|---|
| 4,706,074 A | * | 11/1987 | Muhich et al. ............... | 345/157 |
| 5,111,296 A | * | 5/1992 | Duffield et al. .............. | 348/565 |
| 5,113,259 A | * | 5/1992 | Romesburg et al. ......... | 348/565 |
| 5,983,293 A | * | 11/1999 | Murakami .................... | 710/56 |
| 6,968,366 B1 | * | 11/2005 | Zhang et al. ................. | 709/219 |
| 7,013,431 B2 | * | 3/2006 | Taylor et al. ................. | 715/788 |
| 7,542,050 B2 | * | 6/2009 | Kramer et al. ............... | 345/629 |
| 7,567,304 B2 | * | 7/2009 | Kim et al. .................... | 348/725 |
| 2003/0030613 A1 | * | 2/2003 | Chae ........................... | 345/89 |
| 2003/0105816 A1 | * | 6/2003 | Goswami ..................... | 709/204 |

(Continued)

FOREIGN PATENT DOCUMENTS

WO    WO 2005076503 A1 *    8/2005

*Primary Examiner*—Duc Nguyen
*Assistant Examiner*—Hai V Nguyen
(74) *Attorney, Agent, or Firm*—Cha & Reiter, LLC

(57) ABSTRACT

Disclosed is a method for providing heterogeneous services using a PIP function in a terrestrial DMB receiver. The method includes: a first step of receiving a key input for activating the PIP function and displaying a list of services in an available ensemble during use of a desired DMB service; a second step of selecting a desired item in the list of services; a third step of identifying if the desired item selected at the second step is an "exchange" function and identifying if PIP function of the terrestrial DMB receiver is activated when the selected item is the "exchange" function; a fourth step of exchanging a service of a main screen for a service of a PIP screen, when it is identified that the PIP function is activated at the third step; and a fifth step of identifying if the desired item selected at the second step is the "exchange" function and displaying the selected item on the PIP screen when the selected item is not the "exchange" function.

6 Claims, 7 Drawing Sheets

U.S. PATENT DOCUMENTS

| | | | | |
|---|---|---|---|---|
| 2003/0107605 | A1* | 6/2003 | Iwamura | 345/810 |
| 2004/0056087 | A1* | 3/2004 | Bonneau et al. | 235/380 |
| 2005/0031092 | A1* | 2/2005 | Umemura et al. | 379/88.13 |
| 2005/0102638 | A1* | 5/2005 | Jiang et al. | 715/855 |
| 2005/0232136 | A1* | 10/2005 | Kwak | 370/208 |
| 2006/0039308 | A1* | 2/2006 | Kim | 370/312 |
| 2006/0200779 | A1* | 9/2006 | Taylor | 715/781 |
| 2007/0023497 | A1* | 2/2007 | Chuang et al. | 235/375 |
| 2007/0035513 | A1* | 2/2007 | Sherrard et al. | 345/157 |
| 2007/0081531 | A1* | 4/2007 | Jung et al. | 370/389 |
| 2007/0082608 | A1* | 4/2007 | Nam | 455/3.06 |
| 2007/0100219 | A1* | 5/2007 | Sweitzer et al. | 600/323 |
| 2007/0275762 | A1* | 11/2007 | Aaltone et al. | 455/566 |
| 2010/0058193 | A1* | 3/2010 | Sherrard et al. | 715/738 |

\* cited by examiner

METHOD FOR PROVIDING HETEROGENEOUS SERVICES IN TERRESTRIAL DIGITAL MULTIMEDIA BROADCASTING SYSTEM USING PICTURE-IN-PICTURE FUNCTION

CLAIM OF PRIORITY

This application claims priority to an application entitled "Method for Providing Heterogeneous Services in Terrestrial Digital Multimedia Broadcasting System Using Picture-In-Picture Function" filed with the Korean Intellectual Property Office on Oct. 12, 2005 and assigned Serial No. 2005-96089, the contents of which are incorporated herein by reference as if fully set forth herein.

BACKGROUND OF THE INVENTION

1. Field of the Invention

The present invention relates to a user interface for a digital multimedia broadcasting (DMB) receiver, and more particularly to a method for simultaneously providing a video service and a data service, which are received through an ensemble, in a terrestrial DMB using a Picture-In-Picture (PIP) function.

2. Description of the Related Art

A terrestrial DMB is a Korean standard system which provides multimedia broadcasting services including video based on a Digital Audio Broadcasting (DAB, Eureka-147) system, which is a standard for European digital radio broadcast capable of simultaneously providing data services and high-quality audio services similar to CD sounds.

In comparison with general digital broadcasts such as Advanced Television Systems Committee (ATSC) and Digital Video Broadcasting (DVB), such a terrestrial DMB has an advantage of viewing a broadcast during movement of a DMB receiver that is receiving the broadcast. Therefore, if a user has a DMB receiver, he/she can view the broadcasts anywhere and at any time.

The terrestrial DMB also provides a broadcasting service that includes an audio service and a data service, as well as a video service. Therefore, the terrestrial DMB can provide a greater number of channels and services than a conventional digital broadcast service.

The basic unit of broadcast terrestrial DMB signals is an ensemble. One ensemble can include various services. Each service includes service components.

In other words, one ensemble becomes a basic element which constitutes the terrestrial broadcast signal. Thus, a user selects a certain service in the ensemble so as to view the service. Generally, one ensemble may include a plurality of video services, audio services, and data services.

FIG. 1 is a block diagram illustrating a configuration of an ensemble used for a terrestrial Digital Multimedia Broadcasting (DMB) system.

Referring to FIG. 1, the ensemble used for the terrestrial DMB system includes various services 102-104 and service components 105-110 comprising each service.

Such an ensemble has a configuration based on a DAB standard proposed by Eureka-147. As shown in FIG. 1, the ensemble 101 having a label entitled "DAB ENSEMBLE ONE" includes services "ALPHA 1" 102, "BETA RADIO" 103, and "ALPHA 2 RADIO" 104, each of which includes a plurality of service components 105, 106, 107, 108, 109, and 110.

Each of the service included in an ensemble is transmitted in a separate subchannel of one ensemble frame of a Main Service Channel (MSC) 114-118. The configuration information of the MSC can be identified through Multiplex Configuration Information (MCI) 111 and Service Information (SI) 112, which are received in a Fast Information Channel (FIC).

When a DMB receiver selects and tunes to a particular ensemble, the DMB receiver does not immediately extract and display the particular service contained in the MSC of the ensemble, but analyzes the MCI 111 and SI 112 of the FIC so as to display the services of the MSC.

Hereinafter, the Korean terrestrial DMB system which has been currently proposed will be described. Six ensembles are allocated to the Korean terrestrial DMB system, each of which includes various services.

Tables 1A and 1B indicate the ensemble information and service information allocated to the Korean terrestrial DMB. As listed in Tables 1A and 1B, the Korean terrestrial DMB includes seven video channels, thirteen audio channels, and seven data channels.

TABLE 1A

| Service provider | Channel Configuration Plan (Channel - Type - Transmission Rate) | Operation Planning | Broadcasting Field |
|---|---|---|---|
| Korea Broadcasting System | KBS Mobile 1 - TV - 548k | Direct Operation | General |
| | KBS Mobile 3 - Radio - 128k | Direct Operation | Music |
| | KMMB R - Radio - 128k | Hire (KMMB) | Living and Economy |
| | OZIC - Radio - 128k | Hire (CJ Media) | Music |
| | KBS Mobile 5 - Data - 220k | Direct Operation | General |
| Munwha Broadcasting Corp. | MBC DMB TV - TV - 548k | Direct Operation | General |
| | MBC DMB Radio - Radio - 128k | Direct Operation | General |
| | MBN Radio - Radio - 128k | Hire (MBN) | Economy |
| | Arirang English - Radio - 128k | Hire (Arirang TV) | Korean Culture |
| | MBC DMB Date - Date - 220k | Direct Operation | General |
| Seoul Broadcasting System | SBS DMB TV - TV - 544k | Direct Operation | General |
| | SBS DMB Radio - Radio - 128k | Direct Operation | General |
| | TBS DMB Radio - Radio - 128k | Hire (TBS - Seoul) | Traffic |
| | Gyounggi Broadcasting DMB - Radio - 128k | Hire (Gyounggi Broadcasting) | Culture and Art |
| | Hankyoreh DMB - Data - 96k | Hire (The Hankyoreh) | Job and Education |
| | LGT DMB - Data - 96k | Hire (LG Telecom) | Leisure and Entertainment |
| | SBS DMB Data - Data - 32k | Direct Operation | General |

TABLE 1B

| Service provider | Channel Configuration Plan (Channel - Type - Transmission Rate) | Operation Planning | Broadcasting Field |
|---|---|---|---|
| YTN DMB corp. (provisional name) | YTN Plus - TV - 512k | Direct operation | General |
| | TBN(Korea Transportation Broadcasting Netowrk) - Radio - 160k | Hire (Road Traffic Authority) | Traffic |
| | Satio+ - Radio - | Hire | General |

TABLE 1B-continued

| Service provider | Channel Configuration Plan (Channel - Type - Transmission Rate) | Operation Planning | Broadcasting Field |
|---|---|---|---|
| | 160k YTN Premium - Data - 320k | (Satio) Direct Operation | General |
| Korea DMB corp. (provisional name) | Korea DMB TV - TV - 548k | Direct Operation | General |
| | i4U - Radio - 128k | Hire (CBS) | Living and Culture |
| | Live4U - Radio - 128k | Hire (Music City Media) | Exhibition, Music, and Culture |
| | Korea DMB Data - Data - 348k | Direct Operation | General |
| KMMB corp. (provisional name) | KMMB - TV - 512k | Direct Operation | General |
| | KBS Mobile 2 - TV - 512k | Hire (KBS) | Family and Culture |
| | KMMB Data - Data - 128k | Direct Operation | General |

Picture-In-Picture (PIP) functionality is mainly realized in digital televisions and refers to a function of simultaneously displaying different broadcasts which are divided into a main screen and an auxiliary screen when a user views two different broadcast channels. Generally, two tuners and two video decoders are required in order to use the PIP function. Video signals received are decoded by the tuners and decoders and displayed separately on the main and auxiliary screens thereby realizing the PIP function.

In the case of applying such a PIP function to the terrestrial DMB receiver, two terrestrial DMB tuners and two video decoders are similarly required.

However, in view of the terrestrial DMB receiver using a Radio Frequency (RF) module, when two such terrestrial DMB tuners and two video decoders are used, heat generated from each element is a burden on the terrestrial DMB receiver. Further, during a process of embedding each module in the terrestrial DMB receiver, increasing volume of the terrestrial DMB receiver cannot be avoided, so that the DMB receiver increases in bulk thereby becoming less desirable as a portable device.

SUMMARY OF THE INVENTION

The present invention provides a method for providing heterogeneous services using Picture-In-Picture (PIP) functionality, which simultaneously provides two or more services such as video services and data services to users using a PIP function in a terrestrial DMB receiver.

According to a first embodiment of the present invention, there is provided a method for heterogeneous services using a Picture-In-Picture (PIP) function in a terrestrial Digital Multimedia Broadcasting (DMB) receiver, the method comprising the steps of:

a first step of receiving a key input for activating the PIP function and displaying a list of items comprising services in an available ensemble and an "exchange" function of the DMB, during use of a desired DMB service;

a second step of selecting a desired item in the list of items;

a third step of identifying if the desired item selected at the second step is the "exchange" function and identifying if the PIP function of the terrestrial DMB receiver is activated when the selected item is the "exchange" function;

a fourth step of exchanging a service of a main screen for a service of a PIP screen, when the PIP function is activated at the third step; and a fifth step of identifying if the desired item selected at the second step is of the "exchange" function and displaying the selected item on the PIP screen, when the selected item is not the "exchange" function.

According to a second embodiment of the present invention, there is provided a method for heterogeneous services using a PIP function in a terrestrial DMB receiver, comprising the steps of:

during use of a current DMB service, a first step of receiving a key input for performing the PIP function and displaying a list of services in an available ensemble according to whether or not the PIP function is activated;

a second step of selecting a desired item in the list of services;

a third step of identifying if the selected desired item at the second step is a menu item of "exchange" and exchanging a service of a main screen for a service of in a PIP screen when the selected item is the menu item "exchange"; and a fourth step of identifying if the desired item selected at the second step is the menu item of "exchange" and displaying the selected item in the PIP screen when the selected item is not any of the menu item "exchange" and the current DMB service.

BRIEF DESCRIPTION OF THE DRAWINGS

The features and advantages of the present invention will be more apparent from the following detailed description taken in conjunction with the accompanying drawings, in which:

FIG. 4 is an exemplary view illustrating a process for setting a Picture-In-Picture (PIP) function according to a method for providing services using the PIP function in a terrestrial DMB receiver, according to the present invention;

FIG. 5 is an exemplary view illustrating a process for exchanging screens for each other according to the method for providing the services using the PIP function in the terrestrial DMB receiver, according to the present invention;

DETAILED DESCRIPTION OF THE INVENTION

Hereinafter, the preferred embodiment of the present invention will be described with reference to the accompanying drawings. For the purposes of clarity and simplicity, a detailed description of known functions and configurations incorporated herein is omitted to avoid making the subject matter of the present invention unclear.

Generally, conventional television broadcasts have transmitted signals based on services each of which is carried by one channel, i.e. one frequency, by a broadcasting station. Therefore, if a user simultaneously views two channels or uses different services, for example, a data service and a video service, two tuners are required because two services must be received through two frequencies, respectively. Further, in the case of decoding signals received through the two tuners, conventional PIP television receivers also must have two decoders in order to simultaneously decode two signals.

However, as described above, the DAB technology, which is the basis for the terrestrial DMB, constructs and transmits an ensemble comprising a plurality of services in one channel, thereby providing the plurality of services using a single frequency.

Figure 1:
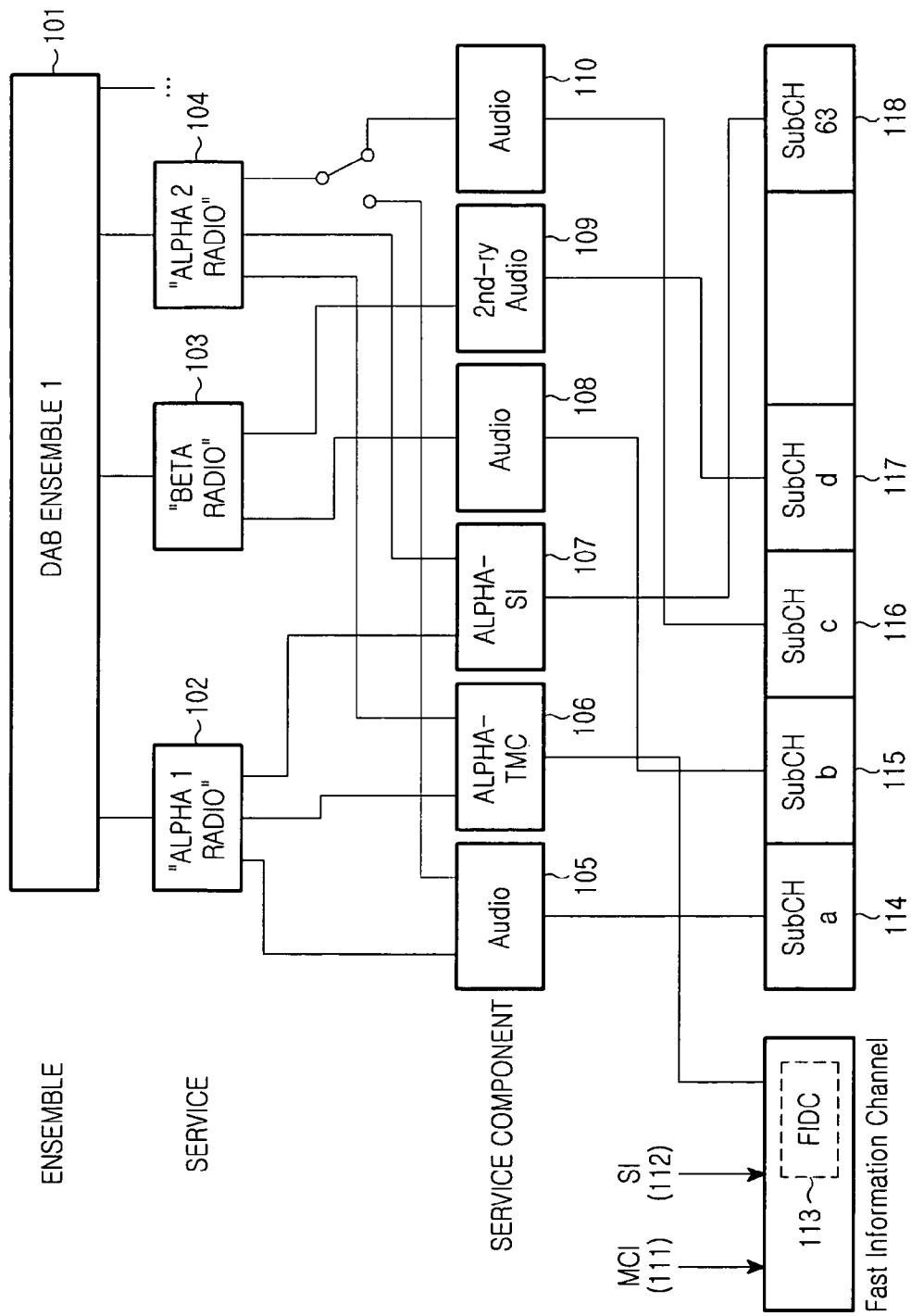
FIG. 1 is a block diagram illustrating a configuration of an ensemble used by a terrestrial Digital Multimedia Broadcasting (DMB) system.

FIG. 1 is a block diagram illustrating a configuration of an ensemble used for a terrestrial DMB system.

Referring to FIG. 1, the ensemble used in the terrestrial DMB system includes a plurality of services 102-104 and service components 105-110 included in each service. The configuration of such an ensemble satisfies the DAB standard proposed by the existing Eureka-147. As shown in FIG. 1, therefore, an ensemble 101 having a label named "DAB ENSEMBLE ONE" includes services denoted by "ALPHA 1 RADIO" 102, "BETA RADIO" 103, and "ALPHA 2 RADIO" 104, each of which include a plurality of service components 105-110, respectively.

The services of such an ensemble are included in a portion of one ensemble frame which is a Main Service Channel (MSC). The configuration information of such an MSC is identified through Multiplex Configuration Information (MCI) 111 and Service Information (SI) 112 received in a Fast Information Channel (FIC).

When a particular ensemble is selected and tuned to, the DMB receiver does not immediately extract and display the services contained in the MSC of the ensemble, but first analyzes the MCI 111 and SI 112 of the FIC in order to display the services in the MSC.

Figure 2:
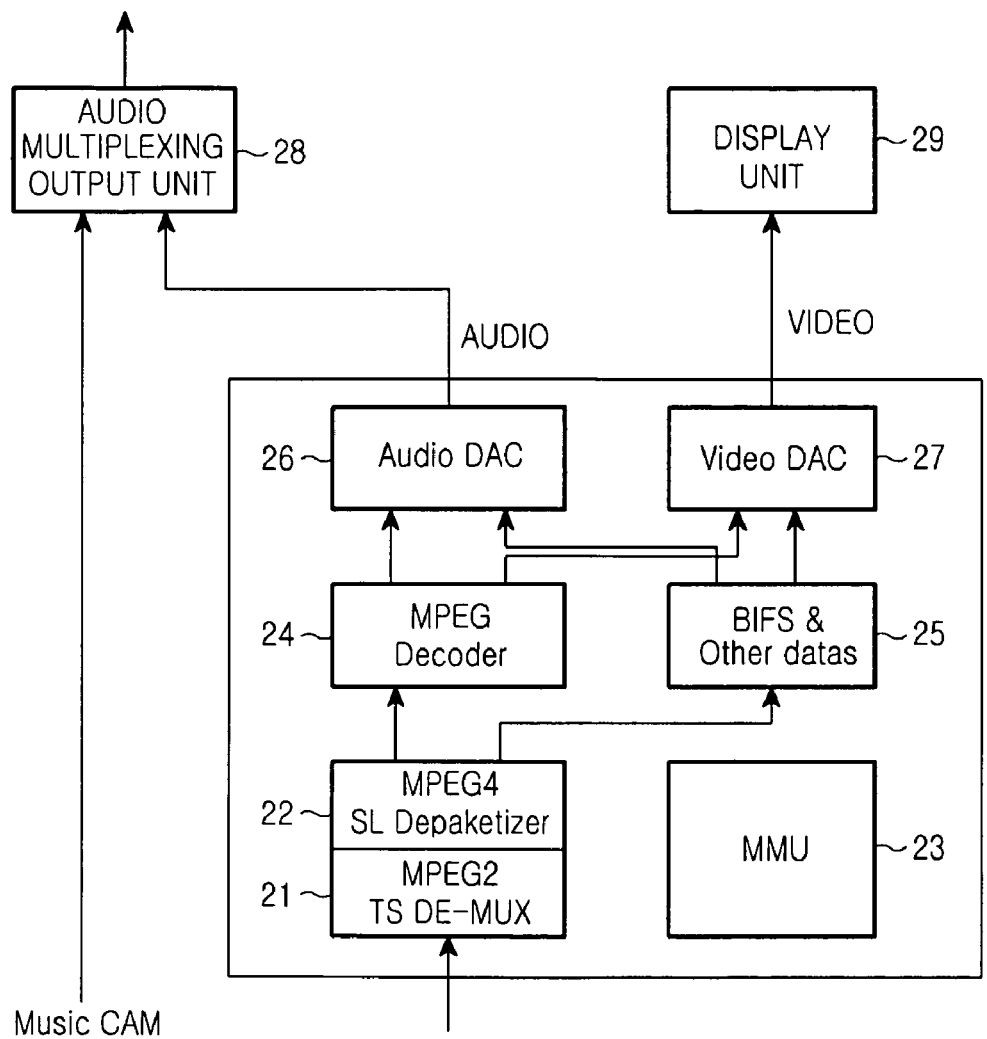
FIG. 2 is a block diagram illustrating a configuration of an apparatus for providing a video service in a conventional terrestrial DMB receiver.

FIG. 2 is a block diagram illustrating a configuration of an apparatus for providing a video service in a conventional terrestrial DMB receiver.

Referring to FIG. 2, the conventional terrestrial DMB receiver includes a device for providing video services. The device for providing video services includes an MPEG2 TS demuliplexer 21 for receiving and demultiplexing MPEG2 TS, a depacketizer 22 for depacketizing an MPEG4 SL packet demultiplexed by the demultiplexer 21, and dividing the depacketized MPEG4 SL into MPEG data and other data so as to transmit the MPEG data and the other data, an MPEG decoder 24 for receiving and decoding the MPEG data from the MPEG4 SL depacketizer 22, a BIFS and data processor 25 for receiving and processing the other data from the MPEG4 SL depacketizer 22, an audio Digital-Analog Converter (DAC) 26 for receiving audio data from the MPEG decoder 24, and the BIFS and data processor 25 to convert the audio data into analog signals, a video DAC 27 for receiving video data from the MPEG decoder 24, and the BIFS and data processor 25 to convert the video data into analog signals, an audio multiplexing and outputting unit 28 for receiving and multiplexing the audio signals from the audio DAC 26, and a music CAM, and a display unit 29 for receiving the analog video signals from the video DAC 27 to output the analog video signals.

In the conventional terrestrial DMB receiver shown in FIG. 1, the device for providing the video service is associated with a middleware decoder for the terrestrial DMB data broadcast to simultaneously provide video service and data service. In this case, a PIP function is used to simultaneously provide the video service and the data service.

Figure 3:
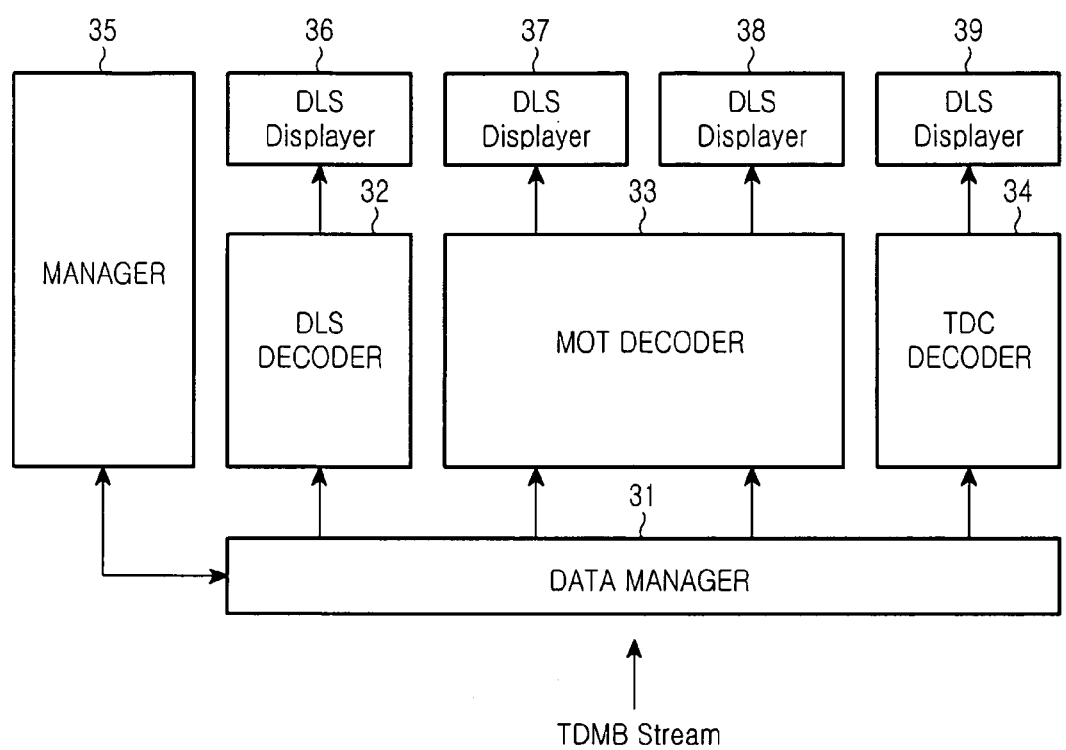
FIG. 3 is a block diagram illustrating a configuration of a middleware decoder for a data broadcast in a conventional terrestrial DMB system.

FIG. 3 is a block diagram illustrating a configuration of a middleware decoder for a data broadcast in a conventional terrestrial DMB system.

Referring to FIG. 3, the middleware decoder for the terrestrial DMB data broadcast includes a data manager 31 that receives a terrestrial DMB stream, extracts data for a data service from the DMB stream to output information about the data to a manager 35, and output the extracted data to different decoders according to data formats, the decoders 32, 33, and 34 corresponding to data for a data service according to the kinds of the data, output units 36, 37, 38, and 39 for outputting the decoded data through the decoders 32, 33, and 34, respectively, and the manager 35 for receiving information about the data for the data service output from the data manager 31, and managing the operation of the decoders 32, 33, and 34 according to users' selections.

Here, the data for the data service may be classified by a type of data service into Multimedia Object Transfer (MOT) data, Transparent Data Channel (TDC) data, and Dynamic Label Service (DLS) data. The data respectively correspond to the MOT decoder 33, the TDC decoder 34, and the DLS decoder 32 and are output thereto by the data manager 31.

Each output unit 36, 37, 38 or 39 functions as a browser according to the type of data service. Specifically, in the case where the data service is a service of Broadcast Web Site (BWS), the output units operate as a web browser. Where the data service is an Electronic Program Guide (EPG), the output units operate as a display window for the EPG. Further, where the data service is a Transport Protocol Expert Group (TPEG), the output units operate as a display window for corresponding transport information.

Hereinafter, the operation of outputting the video service and the data service is described with reference to FIGS. 2 and 3.

In general, an ensemble that terrestrial DMB service providers provide includes a video service, a plurality of audio services, and a plurality of data services.

Specifically, said data services include TPEG, BWS, and DLS, etc. The Memory Management Unit 23 in FIG. 2 and the video decoder separately decode data for these services. Thus, two data services can be simultaneously provided by using the PIP function of the video decoding device shown in FIG. 2.

With respect to the execution of the PIP function in the first embodiment of the present invention, a mini EPG function, which provides additional service information that a user wants to receive, is realized in a program currently received so as to inform the user of available services in the same ensemble. Accordingly, the user can select and receive the services through a PIP mode.

Specifically, the middleware for the terrestrial DMB data broadcast simultaneously decodes the data service contained in the ensemble using the decoder block configuration of FIG. 3 and transmits the decoded data to each application to allow the manager 25 to activate the service which the user selects so that these functions can be performed.

Further, with relation to the audio, it is possible to design the audio converter to exchange a main audio service with an auxiliary audio service. Therefore, the audio converter mainly outputs audio information on the main audio service, while selectively outputting audio information on the auxiliary service according to a users' selection.

FIG. 4 is an exemplary view illustrating a process for setting a PIP function according to a method for providing services using the PIP function in a terrestrial DMB receiver, according to the present invention.

Figure 4A:
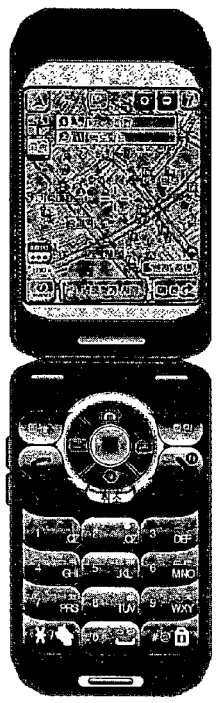
FIG. 4A is an exemplary view illustrating a case of using a data service, such as TPEG, as a main service.
Figure 4B:
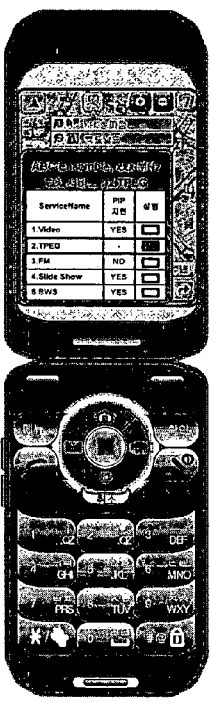
FIG. 4B illustrates a general mini EPG.

FIG. 4A is an exemplary view showing the case of using a data service, such as TPEG, as the main service. In FIG. 4A, when a user carries out a desired key input in order to output the mini EPG information so as to set the PIP function, a list of services in the same ensemble is output in the form of the mini EPG, as shown in FIG. 4B.

On the other hand, on a menu screen shown in FIG. 4, support of a PIP function for FM service is set to "No." In this case, service in which the support of the PIP function is set to "No" cannot be selected while the movement of a cursor takes place to set a focus. Thus, it is possible to avoid the selection of a service in which the PIP function is not supported.

Figure 4C:
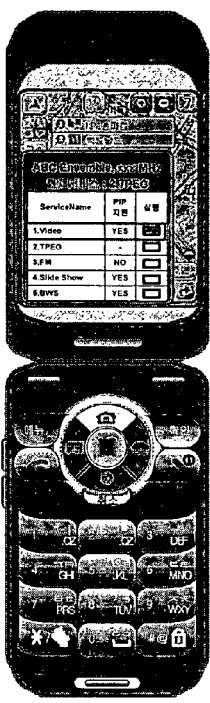
FIG. 4C illustrates selection of a desired service from the general mini EPG to be simultaneously output with a main service.
Figure 4D:
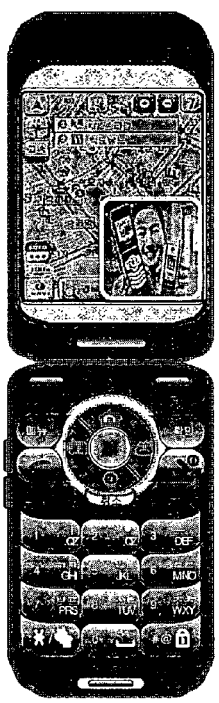
FIG. 4D illustrates a selected service being displayed in the form of a PIP.

Furthermore, as illustrated in FIG. 4C, when the user selects desired services to be simultaneously output from the corresponding mini EPG (selecting a video service in the embodiment of the present invention), the selected service is displayed in the form of PIP shown in FIG. 4D.

In this case, the mini EPG may have a shape different from that illustrated in FIG. 4D, depending on the realization thereof. However, the displayed information includes a list of all services of the ensemble including a currently used service, information on whether the corresponding service supports the PIP function, and information on whether the corresponding service is currently being used.

Referring to the mini EPG shown in FIGS. 4B and 4C, the mini EPG displays a list of all services in the ensemble, including the currently used service. Further, the mini EPG allows the user to identify whether each service item supports the PIP function, but does not display whether the PIP function is supported for the currently used item. The selected items are indicated in the form of a check box. In an initial status, i.e. non-activated status, of the PIP service, the check box indicates a main service.

FIG. 5 is an exemplary view illustrating a process for exchanging screens with each other according to the method for providing the services using the PIP function in the terrestrial DMB receiver, according to the present invention.

Figures 5A, 5B, 5C, 5D:
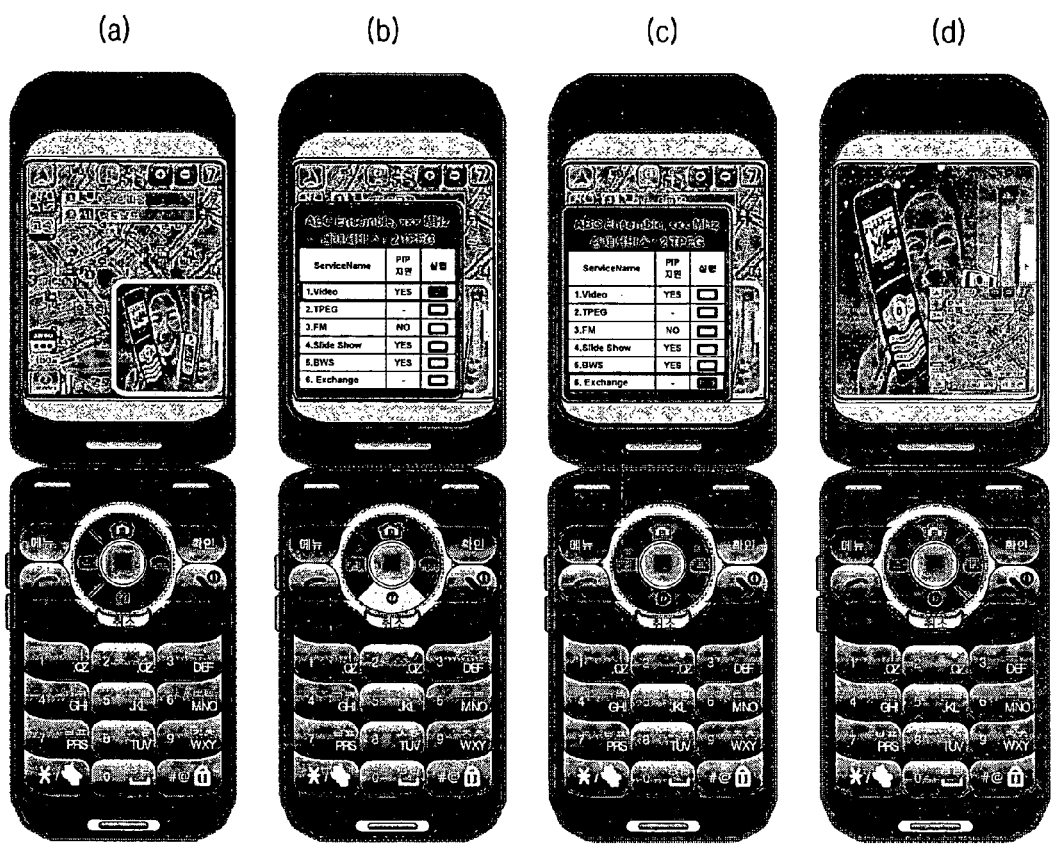
FIG. 5A illustrates a PIP screen displayed on a main screen.
FIG. 5B illustrates selection of a video service item from a list of service items displayed on a main screen.
FIG. 5C illustrates selection of an "exchange" service item from a list of service items displayed on a main screen.
FIG. 5D illustrates a screen wherein the PIP and main screen of FIG. 5A has been "exchanged".

FIG. 5A exemplarily shows a PIP screen for the case where a data service such as TPEG is used as a main service, and a video service is used as an auxiliary service. In FIG. 5A, when a user performs a desired key input in order to set the PIP function, a list of services in the same ensemble as a currently used DMB service is output in the form of a mini EPG display. In this case, the list of services to be output includes an "exchange" menu item selection. The "exchange" menu item is for exchanging the main service with the auxiliary service. Here, the "exchange" menu item can be additionally displayed when the PIP function is executed. Further, the corresponding item may be displayed in a general mini EPG as shown in FIG. 4B.

On the other hand, when the user selects the menu item "exchange" from the corresponding mini EPG as shown in FIG. 5C, the main service and the auxiliary service are exchanged with each other and displayed as illustrated in FIG. 5D.

FIG. 6 is an exemplary view illustrating a process for ending the PIP function according to an alternative method for providing the services using the PIP function in the terrestrial DMB receiver, according to the present invention.

Figure 6A:
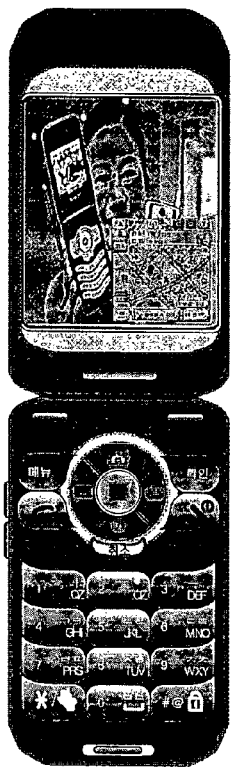
FIG. 6A is an exemplary view illustrating a process for ending the PIP function according to the method for providing the services using the PIP function in the terrestrial DMB receiver, according to the present invention.
Figure 6B:
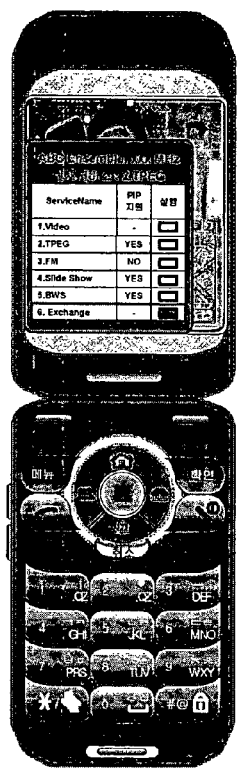
FIG. 6B exemplarily illustrates a PIP screen wherein a TPEG data service is displayed as an auxiliary service while a video service is simultaneously displayed as a main service.

FIG. 6A exemplarily illustrates a PIP screen wherein a TPEG data service is displayed as an auxiliary service while a video service is simultaneously displayed as a main service. In FIG. 6A, when the user inputs a desired key in order to obtain the mini EPG information of an ensemble so as to set the PIP to display a service selected from a list of services in the ensemble that is output in the form of a mini EPG, as shown in FIG. 6B. In this case, the list of services output in the mini EPG information further includes an "exchange" function. The "exchange" function is a menu entry for exchanging the respective service and display of the main screen and of the PIP. Here, the "exchange" function can be added to an already displayed mini EPG information whenever the PIP function is activated by a user.

Figure 6C:
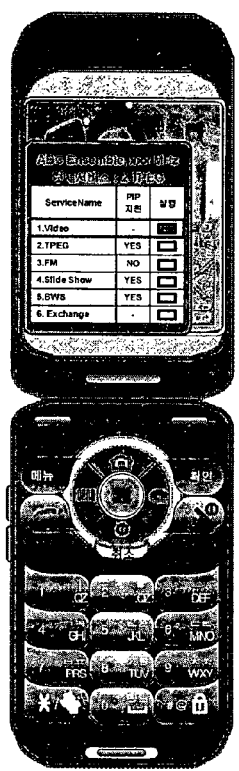
FIG. 6C exemplarily illustrates the main and overlayed PIP screens wherein the PIP screen displays a list of services in an available ensemble in the form of a mini EPG.
Figure 6D:
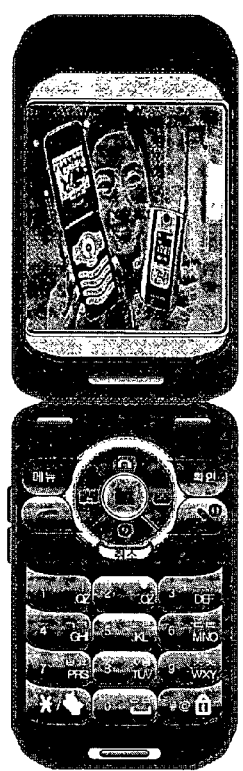
FIG. 6D illustrates the resulting display when the user selects a service that is identical to the currently executed service main service from a mini EPG, i.e., the execution of the PIP function is ended and only the main service is displayed.

Furthermore, when the user selects a service that is identical to the currently executed service as the main service from the corresponding mini EPG as shown in FIG. 6C, the execution of the PIP function is ended, i.e., the PIP function is deactivated, and only the main service is displayed as illustrated in FIG. 6D.

Figure 7:
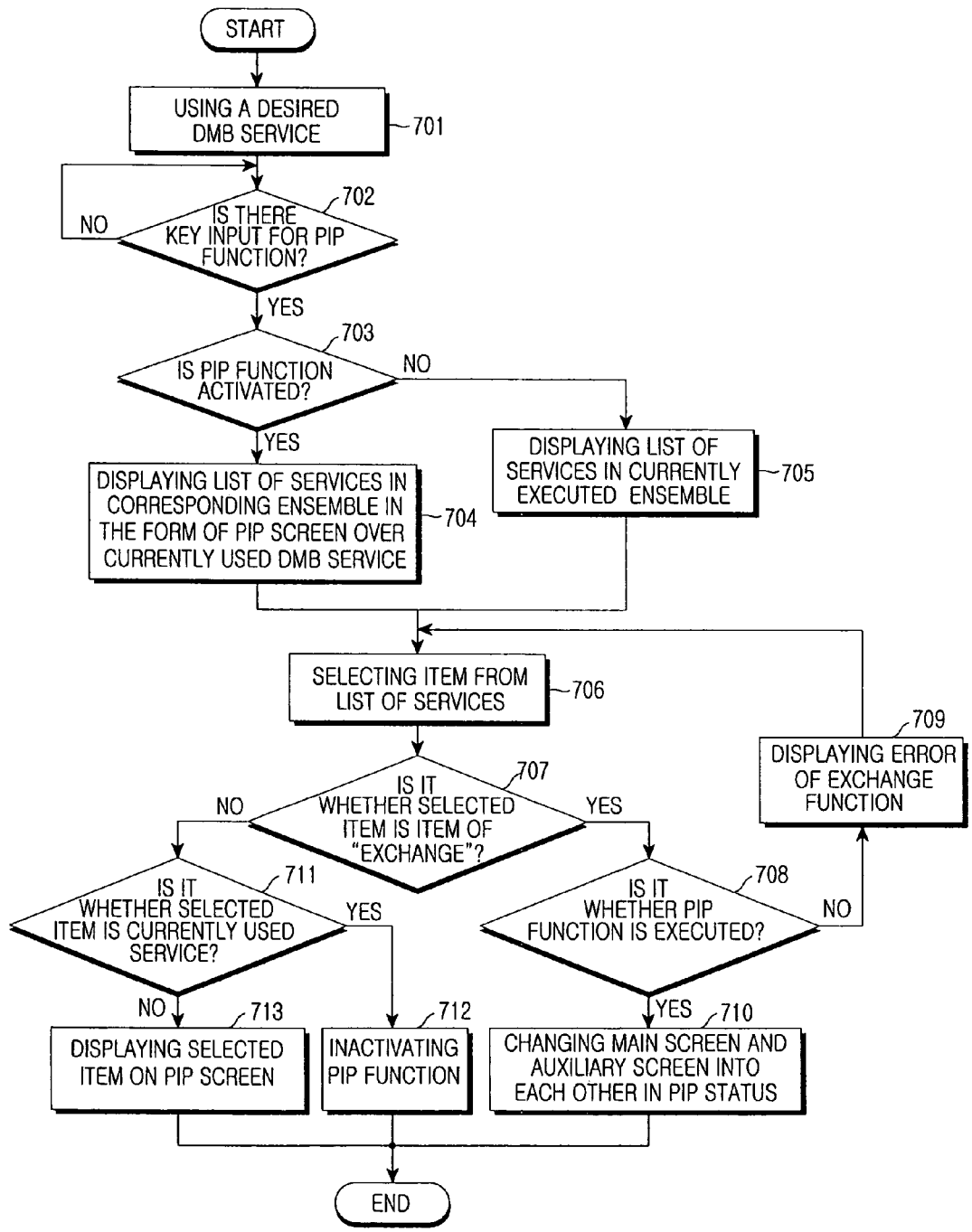
FIG. 7 is a flowchart illustrating the process for providing heterogeneous services using the PIP function in the terrestrial receiver, according to the present invention.

FIG. 7 is a flowchart illustrating the process for providing heterogeneous services using the PIP function in the terrestrial receiver, according to the present invention.

Referring to FIG. 7, in a method for providing heterogeneous services using a PIP function in the terrestrial DMB receiver according to the present invention, first, when a key for the PIP function is input at step 702 during use of a desired DMB service at step 701, it is identified whether or not the PIP function is activated at step 703, and a list of all services in an ensemble including a currently used DMB service is displayed at steps 704 and 705. When the PIP function is activated, the list of all the services in the ensemble including the currently used DMB service is displayed in a PIP over the currently used DMB service. In this case, especially, the list of the services is set to additionally display an "exchange" function. When the PIP function is not activated, the list of all services in the ensemble including the currently used DMB service is displayed in a PIP over the currently used DMB service. In this case, the "exchange" function is not displayed. Steps 703, 704, and 705 can be selectively applied along with steps 708 and 709 described below. Specifically, in the case of displaying the "exchange" function regardless of whether the PIP function is activated, steps 703, 704 and 705 may be replaced by step 702 in which the list of all services in the ensemble, including the currently used DMB service, is displayed in a PIP over the currently used DMB service. Further, in the case where the "exchange" function is selectively displayed through steps 703, 704, and 705, steps 708 and 709 can be omitted, and it is possible to immediately proceed from step 707 to step 710.

Then, a desired item is selected from the displayed service list at step 706.

In this case, it is identified whether the selected item is an "exchange" function at step 707. If the selected item is the "exchange" function, it is identified whether the PIP function is activated, at step 708. As the result of the identification, when the PIP function is not activated, an "exchange" function error message is displayed at step 709 and the process returns to step 706. Meanwhile, when the PIP function is activated, the main service screen and the auxiliary service screen are exchanged at step 710.

If the selected item is not the "exchange" function at step 707, it is identified whether the selected item is the currently used service, at step 711. If the selected item is not the currently used service, the PIP function is executed so as to display the selected item on the auxiliary screen, at step 713. On the other hand, if the selected item is the currently used service, the PIP function is deactivated so as to display only the selected item in the main screen, at step 712.

The method of the present invention as described above is implemented as a program which can be stored in a recording medium, for example, a CD-ROM disc, RAM, a floppy disc, a hard disc, and a magneto-optical disc, etc, which are read by a computer and executed thereby.

According to the present invention as described above, the PIP function is executed in the terrestrial DMB receiver so as to provide a DMB user interface configuration in which a plurality of services provided in one ensemble can be displayed, thereby providing easy and fast service to users.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for heterogeneous services using a Picture-In-Picture (PIP) function in a terrestrial Digital Multimedia Broadcasting (DMB) receiver, the method comprising:
   a first step of receiving a key input for activating the PIP function and displaying a list of items comprising services in an available ensemble and an "exchange" function of the DMB, during use of a desired DMB service;
   a second step of selecting a desired item in the list of items;
   a third step of identifying if the desired item selected at the second step is the "exchange" function and identifying if the PIP function of the terrestrial DMB receiver is activated when the selected item is the "exchange" function;
   a fourth step of exchanging a service of a main screen for a service of an auxiliary screen in a PIP screen, when the PIP function is activated at the third step;
   a fifth step of identifying if the desired item selected at the second step is of the "exchange" function and displaying a service of the selected item on the PIP screen, when the selected item is not the "exchange" function; and
   a sixth step of displaying an "exchange" function error when it is identified that the PIP function is not activated at the third step.

2. The method as claimed in claim 1, wherein the fifth step further comprises the steps of:
   a seventh step of identifying if the desired item selected at the second step is an "exchange" function and identifying if the selected item is a currently used service when the selected item is not an "exchange" function;
   an eighth step of deactivating the PIP function and displaying the currently used service in a main screen if the selected item is a currently used service, resulting from the identification at the seventh step; and
   a ninth step of displaying the selected item as a service on the PIP screen if the selected item is not the currently used service, resulting from the identification at the seventh step.

3. The method as claimed in claim 2, further comprising the steps of:
   storing the method as a program in a recording medium of said DMB receiver;
   reading and executing said method stored in said recording medium by a computer processor of said DMB receiver; and
   wherein the storage medium is selected from the group consisting of a CD-ROM disc, RAM, a floppy disc, a hard disc, and a magneto-optical disc.

4. The method of claim 1, wherein the displaying a list of items comprising services in an available ensemble is provided in a format of a mini-Electronic Program Guide (EPG).

5. A DMB receiver having a Picture-In-Picture (PIP) function, comprising:
   a computer program implementing the method of claim 1;
   a storage medium for storing the computer program; and a processor for reading and executing the stored computer program,
   wherein the DMB provides heterogeneous services to a user thereof through the PIP function; and wherein
   the storage medium is selected from the group consisting of a CD-ROM disc, RAM, a floppy disc, a hard disc, and a magneto-optical disc.

6. The receiver of claim 5, wherein the PIP function provides display of a list of items comprising services in an available ensemble provided in a format of a mini-Electronic Program Guide (EPG).

\* \* \* \* \*